Figure 1:
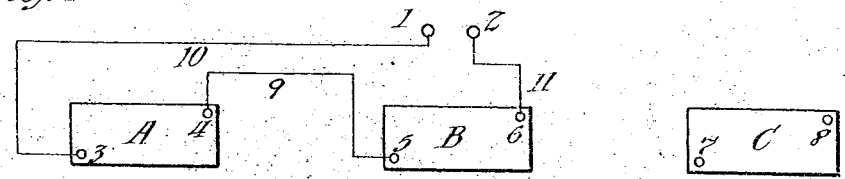

M. R. HUTCHISON.
METHOD OF CHARGING SECONDARY BATTERIES.
APPLICATION FILED JULY 6, 1911.

1,117,493.

Patented Nov. 17, 1914.

2 SHEETS—SHEET 1.

M. R. HUTCHISON.
METHOD OF CHARGING SECONDARY BATTERIES.
APPLICATION FILED JULY 6, 1911.
1,117,493.
Patented Nov. 17, 1914.
2 SHEETS—SHEET 2.
Fig. 7.
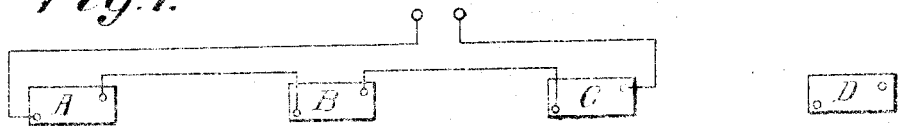
Fig. 8.
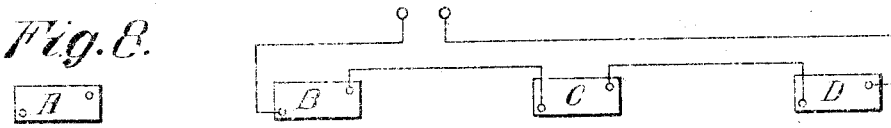
Fig. 9.
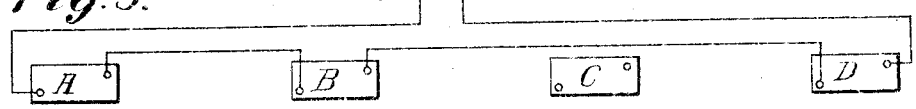
Fig. 10.
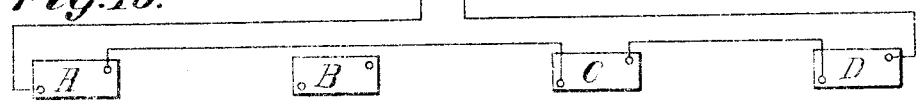
Fig. 11.
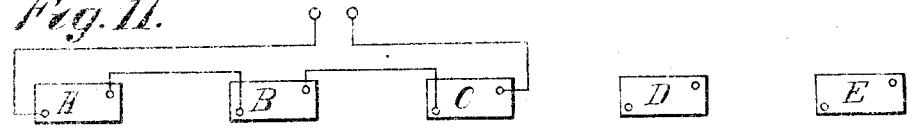
Fig. 12.
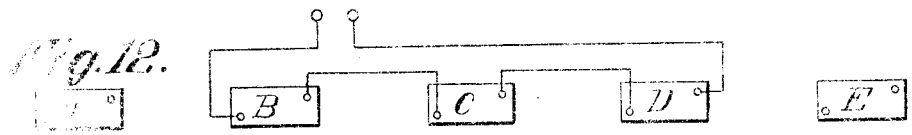
Fig. 13.
Fig. 14.
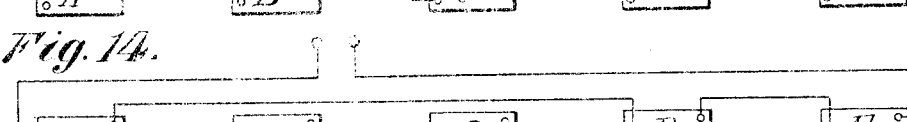
Fig. 15.
WITNESSES
Henry Lanaha
Frederick ...
INVENTOR
Miller Reese Hutchison
by Dyer & Holden
his attorneys.

UNITED STATES PATENT OFFICE.

MILLER REESE HUTCHISON, OF WEST ORANGE, NEW JERSEY, ASSIGNOR TO EDISON STORAGE BATTERY COMPANY, OF WEST ORANGE, NEW JERSEY, A CORPORATION OF NEW JERSEY.

METHOD OF CHARGING SECONDARY BATTERIES.

1,117,493.     Specification of Letters Patent.     Patented Nov. 17, 1914.

Application filed July 6, 1911. Serial No. 637,177.

*To all whom it may concern:*

Be it known that I, MILLER REESE HUTCHISON, a citizen of the United States, and a resident of West Orange, county of Essex, and State of New Jersey, have invented certain new and useful Improvements in Methods of Charging Secondary Batteries, of which the following is a description.

My invention relates to a method of charging secondary batteries and to the circuits by which the cells of a battery may be connected during the carrying out of my improved method.

The object of my invention is to provide a simple and expeditious method of charging the cells of a secondary battery under conditions which render it impossible to charge the battery with all of the cells thereof connected together in series.

My invention is equally applicable to batteries of the lead or acid type or the alkaline type, but the Edison type of alkaline storage battery will be particularly referred to for purposes of illustration in the specification.

When the operation of charging a cell of an Edison type battery is completed or nearly completed, the P. D. around the terminals of the cell is about 1.8 volts. The average E. M. F. of such a cell on normal discharge is 1.2 volts, and on heavy discharge the average is between 1 volt and 1.1 volts. In the case of the lead type of battery also, the P. D. on charge is greater than the electromotive force of the battery on discharge. In many instances where a definite number of cells must be used to give the voltage required on discharge, the P. D. around the terminals of the battery, if all were connected together in series for charging, would be greater than the maximum voltage of the source which happens to be available. My improved method is designed to overcome this difficulty, and generally speaking, contemplates dividing the battery into groups of cells, connecting together a plurality of these groups in such a manner that the P. D. of the connected cells on charge is not greater than the voltage of the source but is preferably nearly equal thereto, charging the cells so connected to part capacity, disconnecting and reconnecting together a second plurality of groups of cells, containing one or more of said first groups and charging to part capacity, and continuing the operation until all of the cells have been fully charged, fully charged groups of cells being omitted when new connections are made. the division of the groups and the length of charge given being so calculated preferably that all of the divisions of connected groups of cells contain the same number of groups and the partial charges given may all be equal.

In order that my invention may be more clearly understood attention is hereby directed to the accompanying drawings forming part of this specification and illustrating diagrammatically arrangements of dividing the cells and connecting the same according to my improved method.

Figure 2:
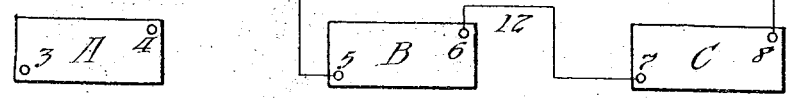
Figure 3:
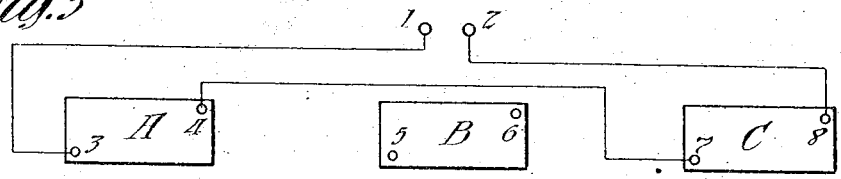
Figure 4:
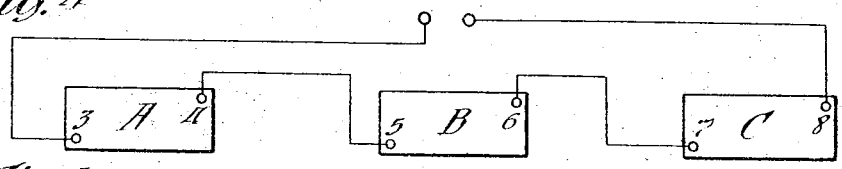
Figure 5:
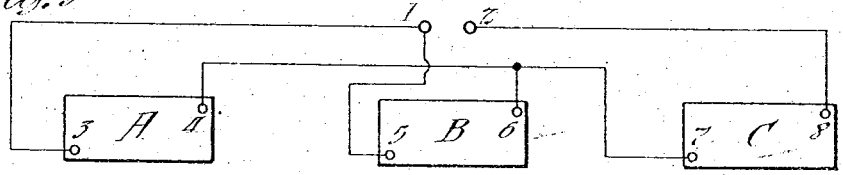
Figure 6:
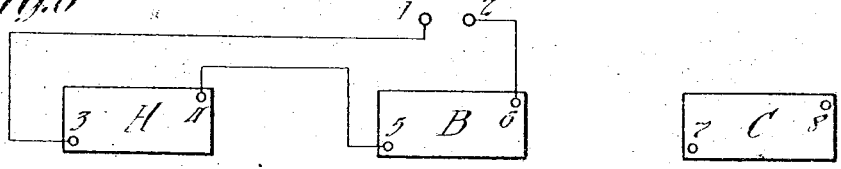

In the drawings, Figures 1, 2 and 3 represent successive wiring connections for charging a battery which is divided into three groups of cells; Fig. 4 represents the battery connected for discharge; Figs. 5 and 6 represent successive wiring connections for charging the battery when one group of cells thereof is more fully charged than the others before the connections are made: Figs. 7, 8, 9 and 10 represent successive wiring connections for charging a battery which is divided into four groups of cells; and Figs. 11, 12, 13, 14 and 15 represent successive wiring connections for charging a battery which is divided into five groups of cells.

For illustration of the method practised as illustrated particularly by Figs. 1, 2, 3 and 4, I will assume a battery of 210 cells installed on a floating crane, which battery, on the one hour discharge rate, shows an average voltage of 220. I also assume that the circuit for charging the cells is connected to a commercial type of compound wound generator capable of supplying a maximum of 252 volts, and also that the cells are to be used to operate the 220 volt motors of the hoisting cranes. In order to charge these 210 cells connected together in series, I would certainly have to connect them to a line carrying at least 378 volts, whereas 252 volts is the maximum available. Accordingly, the supply mains being represented diagrammatically in the drawings by 1 and 2, I divide the battery into three parts, each containing 70 cells and designated in the drawings A, B and C, respectively. The groups A, B and C are represented diagrammatically as having terminals 3—4, 5—6, and 7—8, respectively. To charge, I first connect two of the groups as for example, A and B, in series and connect across the 252 volts mains 1 and 2. This is illustrated in Fig. 1 in which terminals 4 and 5 of groups A and B, are connected together by conductor 9 and the terminals 3 and 6 are connected to the mains by conductors 10 and 11. This gives a maximum P. D. around the terminals of A and B of 252 volts and accordingly no external resistance need be included in the connections. Groups A and B are left connected to the mains until they are both half charged. Then one of the groups, as for example A, is disconnected, and groups B and C are connected in series and across the mains, as illustrated in Fig. 2, in which terminals 6 and 7 are connected by conductor 12 and terminals 5 and 8 are connected to the mains 1 and 2, respectively. This connection is left standing until group B becomes fully charged and group C becomes half charged. Group B is then disconnected and group A substituted therefor, the terminals 4 and 7 of groups A and B being connected together and terminals 3 and 8 of groups A and C being connected to the mains respectively, as shown in Fig. 3. Groups A and C are now half charged and remain connected to the mains until they are fully charged, the whole battery now being fully charged, and ready for a series connection to deliver 220 volts. This connection for discharge is illustrated in Fig. 4 in which groups A, B and C are connected together in series as shown, and connected to the mains, which they are to supply with 220 volt current.

In the event of the machinery of the crane being used when it is at a dock it may be desired to "float" cells on the 220 volt line on the shore, to boost the line when the voltage thereof drops because of heavy load. In such a case any two of the groups A, B and C may be connected in series and across the line, as the Edison cell "floats" at 1.53 volts, neither taking nor giving energy when fully charged and connected to a circuit of 1.53 volts. 140 cells connected in series give 214.2 volts, when each cell has a voltage of 1.53, and the 220 volt line will drop to this voltage on heavy load. Some current will be taken by the cells so connected on a 220 volt line, but when the voltage drops below 214 volts the cells will discharge and thus "boost" the line.

In the event of, for example, groups A and B becoming completely discharged or more fully discharged than group C during the process of boosting, the battery can then be easily charged by the connections shown in Figs. 5 and 6. It being understood that groups A and B are more fully discharged than group C, groups A and B are connected together in parallel and group C connected therewith in series across the charging mains 1 and 2, as illustrated in Fig. 5, in which main 1 is connected with terminals 3 and 5 of groups A and B, terminals 4, 6 and 7 of groups A, B and C, respectively, being connected together and main 2 is connected to terminal 8 of group C. This connection is left standing until group C is fully charged, when group C is disconnected and groups A and B connected together in series as shown in Fig. 6 and fully charged. In Fig. 6 terminals 4 and 5 of groups A and B are connected together and terminals 3 and 6 of groups A and B, respectively, are connected to the mains.

It is evident that my process is not limited to the particular arrangement illustrated in Figs. 1, 2, 3, 4, 5 and 6 or to the number of cells, conditions of voltage, etc., described, which are merely illustrative, but that my method may be practised with success under varying conditions and is as broad as is indicated by the accompanying claims. For example, conditions may be such that it will be found advisable to divide the battery into four equal groups, A, B, C and D, of which any three can be connected together in series and charged without exceeding the maximum voltage of the source of supply as is illustrated in Figs. 7, 8, 9 and 10. In such a case I can connect together in series groups A, B and C, give the same one-third of the charge, then similarly connect groups B, C and D and give one-third of the charge, and then connect groups A, B and D in series and give one-third of the charge, resulting in the complete charge of group B and the two-thirds charge of groups A, C and D. Groups A, C and D may then be connected together in series and given a charge of one-third, which completes the charging of these groups. Or again it may be advisable to divide the battery into five equal groups, A, B, C, D and E, which groups may be charged three at a time as is illustrated in Figs. 11, 12, 13, 14 and 15. In this case we may connect together A, B and C in series and give one third of a charge, then connect B, C and D and give a one third charge, then C, D and E and give a charge of one third, resulting in the complete charge of group C, the two-thirds charging of groups D and B and the one-third charging of A and E. Groups D, E and A may then be connected and given a charge of one third completely charging D. E, A and B may then be connected and given a charge of one-third, resulting in the complete charge of the battery as before.

Having now described my invention what

I claim as new and desire to protect by Letters Patent is:—

1. The method of charging a battery of secondary cells, which consists in dividing the battery into three groups connecting two of the groups in series, charging to one-half capacity, then connecting one of said groups and the third group in series, and charging until the said groups are fully charged and half charged respectively, and then connecting the two half-charged groups in series and fully charging the same, substantially as described.

2. The method of charging a battery of secondary cells, from a source of maximum voltage less than that required to charge the cells when all are connected in series, which consists in dividing the battery into a plurality of groups, connecting together in series a plurality of groups such that the P. D. of the same on charge is less than the maximum voltage of the source, partly charging the same, connecting in series a second plurality of groups including one or more of said first groups, and having a P. D on charge less than the maximum voltage of the source, and giving the same a partial charge, and continuing to connect and charge groups not fully charged, in the same manner, until all are fully charged, substantially as described.

3. The method of charging a battery of secondary cells, from a source of maximum voltage less than that required to charge the cells when all are connected in series, which consists in dividing the battery into a plurality of equal groups, connecting together in series a plurality of groups such that the voltage required to charge the same is slightly less than the maximum voltage of the source, partly charging the same, connecting in series a second plurality of groups equal in number to the first, and including one or more of said first groups, and giving the same amount of charge as was given said first plurality, and continuing to connect and charge groups not fully charged, in the same manner, fully charged groups being omitted when new connections are made, until all are fully charged, the division of the groups and the length of charges being so calculated that all of the divisions of connected groups and all the lengths of charges may be equal, substantially as described.

4. The method of charging a battery of secondary cells, from a source of maximum voltage less than that required to charge the cells when all are connected in series, which consists in dividing the battery into a plurality of equal groups, connecting together certain groups in such a manner that the voltage required to charge the same is less than the maximum voltage of the source, charging the same partially at the same rate, changing the connections to form a new alinement of groups not fully charged and so connected that the voltage required to charge the same is less than the maximum voltage of the source, applying a charge to the same, and continuing to operate in the same manner until all the groups are fully charged, substantially as described.

This specification signed and witnessed this 3rd day of July, 1911.

MILLER REESE HUTCHISON.

Witnesses:
HENRY LANAHAN,
ANNA R. KLEHM.